(12) United States Patent
Jarett

(10) Patent No.: US 7,046,641 B2
(45) Date of Patent: May 16, 2006

(54) PACKET-BASED DOWNLINK LEVEL CONTROL

(75) Inventor: Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 928 days.

(21) Appl. No.: 09/951,335

(22) Filed: Sep. 10, 2001

(65) Prior Publication Data

US 2003/0048761 A1   Mar. 13, 2003

(51) Int. Cl.
*H04B 7/185*   (2006.01)

(52) U.S. Cl. ............... 370/318; 455/13.4; 455/522

(58) Field of Classification Search ............ 370/310, 370/311, 315–325, 389, 395.1; 455/427, 455/522
See application file for complete search history.

(56) References Cited

U.S. PATENT DOCUMENTS 5,619,525 A * 4/1997 Wiedeman et al. ......... 375/130
5,710,982 A * 1/1998 Laborde et al. ............. 455/69
6,421,528 B1 * 7/2002 Rosen et al. ............ 455/67.16
6,829,226 B1 * 12/2004 Apostolides et al. ....... 370/318

OTHER PUBLICATIONS

Gaudenzi et al, DS-CDMA Satellite Diversity Reception for Personal Satellite Communication: Satellite-to-Mobile Link Performance Analysis, IEEE, pp. 658-671, 1998.*

* cited by examiner

*Primary Examiner*—Frank Duong
(74) *Attorney, Agent, or Firm*—Shimokaji & Associates P.C.

(57) ABSTRACT

A packet-based downlink level control subsystem is provided for a wireless communication system. The subsystem includes a mechanism for embedding into each packet a power level code. The subsystem further includes a packet transmitter mechanism responsive to the embedded power level code for adjusting the power of the transmitted signal in accordance with the embedded power level code. This enables the transmitted power levels to be tailored to fit the needs of different individual receiving stations.

15 Claims, 4 Drawing Sheets

PACKET-BASED DOWNLINK LEVEL CONTROL

BACKGROUND OF THE INVENTION

This invention relates to wireless communications systems, including those using satellites, stratospheric platforms, and even terrestrial towers, and particularly to the downlink portions of such systems, which portions transmit signals from wireless platforms such as earth-orbiting satellites to earth-based receiving stations.

One form of satellite communications systems transmits a single stream of data packets from a satellite for reception by multiple receiving stations at different locations on the surface of the earth. Different receiving stations are differentiated by means of a destination user code embedded in a destination user identity field of each data packet. Each receiving station accepts only those packets having its user identity code.

A problem arises in that the received signal strength is not the same at all locations. Typically, the signal strength is some three to four decibels lower at the edge of the transmitted beam as compared to the signal strength at the center of the beam. Thus, the performance of receiving stations located toward the edge of the beam may be reduced to an unsatisfactory level.

A typical solution to this problem is to increase the power of the transmitted downlink beam to the highest level required by any of the receiving stations which, in this case, will normally be the level required by stations located near the edge of the transmitted beam. This, however increases the power consumption of the satellite transmitter. This, in turn, reduces the maximum data handling capability of the satellite.

The present invention provides a better solution to this problem. It enables marginal receiving stations to be adequately serviced without increasing the power used for transmissions to non-marginal receiving stations.

SUMMARY OF THE INVENTION

In accordance with one feature of the invention, there is provided a new and improved packet-based downlink level control subsystem for a wireless communications system. Such subsystem includes a mechanism for embedding into each packet a power level code. Such subsystem also includes a packet transmitter mechanism responsive to the power level code for adjusting the power of the transmitted signal in accordance with the power level code.

In accordance with another feature of the invention, there is provided a method of controlling the power of downlink signals transmitted by a wireless communications system for purposes of conserving transmitted power. Such method includes the step of determining the identity of an intended receiving station. Such method further includes the step of adjusting the power of the transmitted signal in accordance with the identity of the intended receiving station, whereby different power levels may be used for different receiving stations.

For a better understanding of the present invention, together with other and further advantages and features thereof, reference is made to the following description taken in connection with the accompanying drawings, the scope of the invention being pointed out in the appended claims.

DETAILED DESCRIPTION OF THE INVENTION

Figure 1:
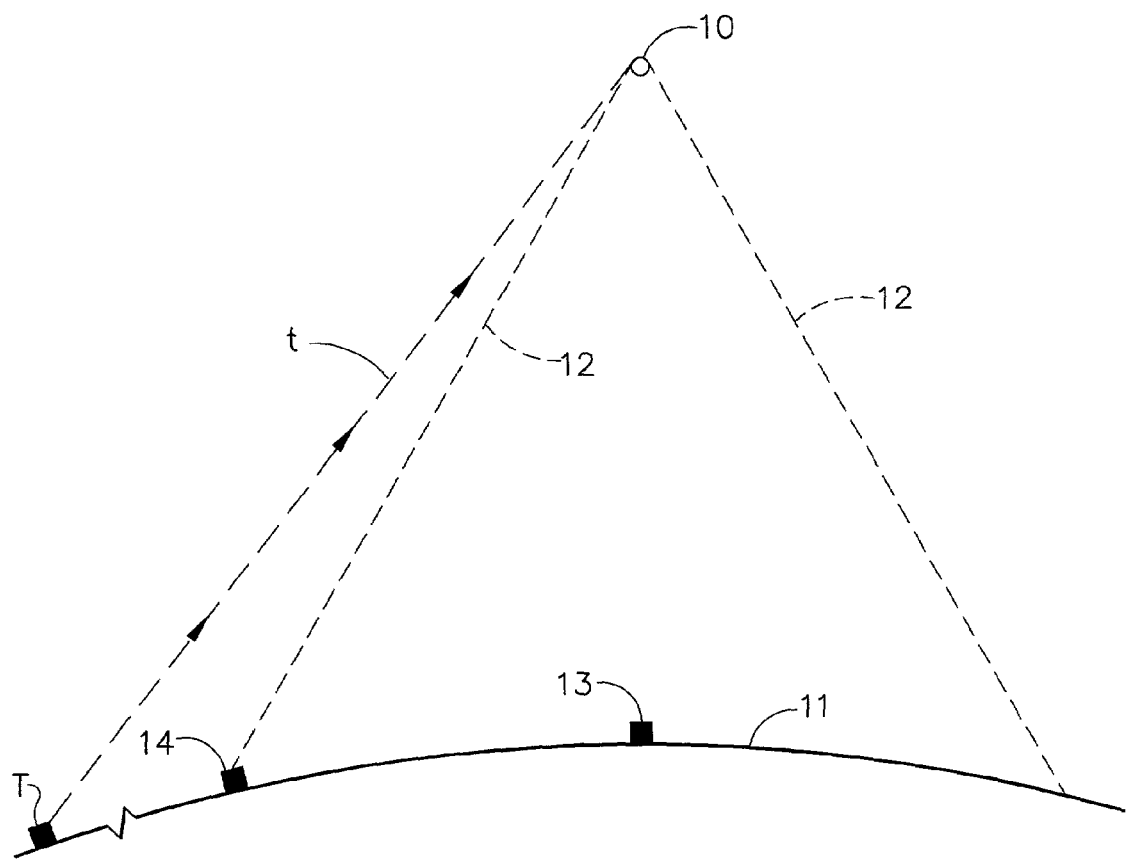
FIG. 1 is a diagrammatic view of a communications satellite in orbit above the earth.

Referring to FIG. 1 of the drawings, there is shown a communications satellite 10 in orbit above the earth 11. The approximate boundaries of the usable portion of the radio-frequency beam of energy transmitted down from the satellite 10 to the earth 11 are represented by broken lines 12. A first receiving station 13 is located at the center of the transmitted beam 12, while a second receiving station 14 is located at the edge of beam 12. An uplink gateway earth station T transmits an uplink beam "t" to the satellite 10. For a given transmitted power level, the signal strength at the surface of the earth decreases at increasing distances from the center of the downlink beam 12. At the edge of the beam (receiving station 14), the signal strength may be some three to four decibels lower than the signal strength at the center of the beam (receiving station 13). For stratospheric platforms and terrestrial towers, the variation in signal strength from the center to the edge of the downlink beam can be even greater.

A feature of the present invention is that the power of the transmitted signal is adjusted in accordance with the location of the receiving station for the packet being transmitted. If, for example, the transmitted packet is intended for receiving station 14, then the transmitter output power may be increased relative to the power that would be used for a packet intended for receiving station 13. In this manner, the link performance for receiving stations at different locations may be made approximately equal. In a more general sense, the present invention can tailor the transmitted power levels to fit the requirements of the individual receiving stations. In this manner, the satellite's downlink power is conserved because each receiving station gets only the power it needs. There is no transmission of excess power for some stations in order to meet the needs of other stations.

Figure 2:
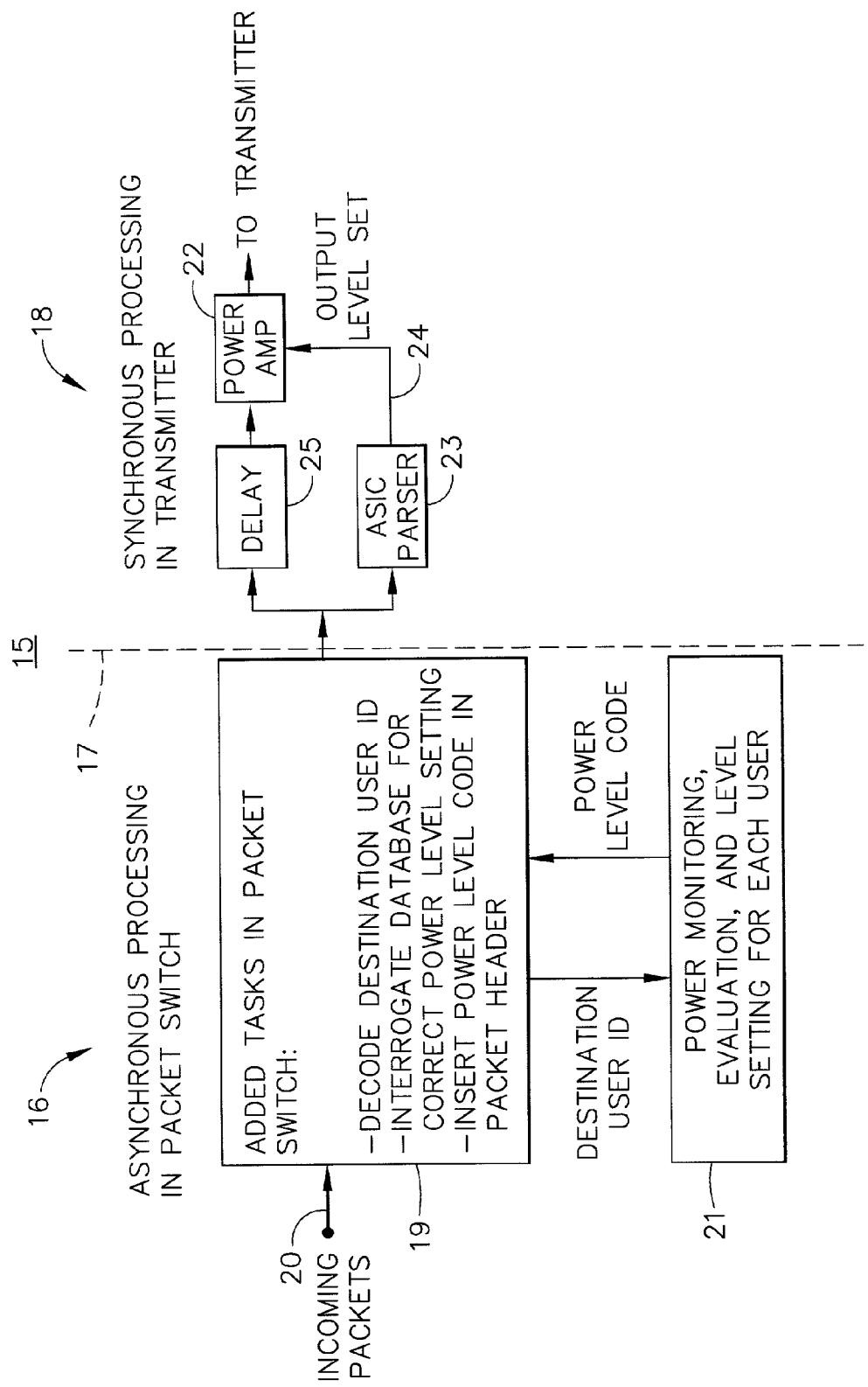
FIG. 2 is a block diagram of a representative embodiment of a packet-based downlink level control system constructed in accordance with the present invention.

Referring to FIG. 2, there is shown a representative embodiment of a packet-based downlink level control system 15 constructed in accordance with the present invention. A first portion 16 of system 15 can be located in an asynchronous packet-switching portion of the satellite 10, but it is preferably located in the uplink gateway station T. This first portion 16 is illustrated on the left side of broken line 17. A second portion 18 of system 15 can be located in a synchronous portion of the satellite 10. This second portion 18 is illustrated on the right side of broken line 17. Processing of packets in the asynchronous portion 16 is not synchronized in time. Packets may be, and generally are, delayed by varying amounts depending on the complexity of the processing required and other loads on the packet processor. In the synchronous portion 18, the movement and transmission of packets must be synchronized with a system clock so that the delay from input to output is constant.

As indicated in FIG. 2, incoming data packets from a packet router can be supplied to a packet-handling unit 19 by way of input line 20. Packet handling unit 19 may do several things. It may include a mechanism for locating and parsing out the destination user identity code embedded in each packet. It may include a mechanism for using this destination user identity code to interrogate a database for determining the desired power level for this user. And it may include a mechanism for embedding into the packet a power level code identifying the desired power level. The power level database can be located in a level setting unit 21 that is coupled to the packet-handling unit 19.

The packets with embedded power level codes produced by unit 19 can be supplied to a packet transmitter mechanism located in the synchronous portion 18. This packet transmitter mechanism is responsive to the power level code in each packet for adjusting the power level of the transmitted signal for the packet to the value specified by the power level code. This packet transmitter mechanism may include a power amplifier 22 for feeding amplified packet signals to a radio-frequency transmitter that drives the satellite downlink antenna. This packet transmitter mechanism may also include a power control mechanism 23 responsive to the power level codes in the packets to be transmitted for supplying gain control signals to the power amplifier 22 by way of signal line 24. These gain control signals on line 24 can adjust the amplification factor of amplifier 22 to provide the desired amount of amplification for each data packet. The greater the amount of amplification, the greater is the power level of the transmitted signal. Power control mechanism 23 may take the form of, for example, an application specific integrated circuit (ASIC) parser mechanism.

The packet transmitter mechanism may also include a time delay mechanism 25 for transferring data packets from the output of the packet handling unit 19 to the signal input terminal of the power amplifier 22. Delay mechanism 25 serves to delay the arrival of the packets at the signal input terminal of power amplifier 22 so as to allow for the settling of power amplifier 22 following a change in the gain control signal on line 24. Time delay mechanism 25 may also provide a time delay increment to allow for the time required for locating and decoding the power level code in the parser mechanism 23. Thus, the gain of power amplifier 22 can be in a steady-state condition and can be at the proper value when the data packet arrives at the signal input terminal of power amplifier 22.

Figure 3:
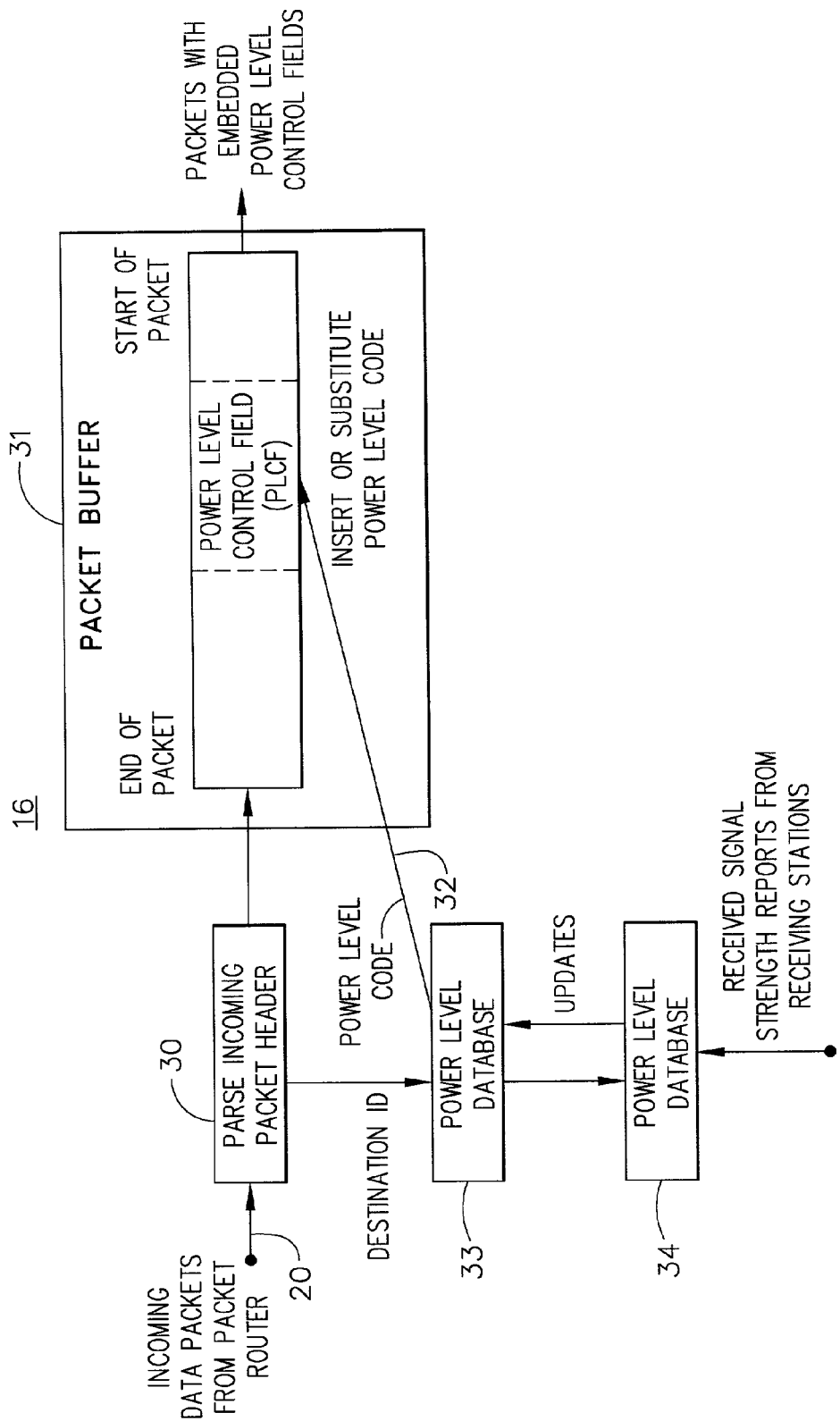
FIG. 3 is a block diagram showing in greater detail an asynchronous packet switching portion of the control system of FIG. 2.

Referring to FIG. 3, there is shown in greater detail the construction of the asynchronous portion 16 of the FIG. 2 system. The packet-handling unit 19 of FIG. 2 can include a parser mechanism 30 and a data buffer mechanism 31, these mechanisms being shown in FIG. 3. Parser mechanism 30 can examine the incoming packets as they pass through parser 30 on their way to packet buffer 31. Parser 30 may locate and reproduce for separate use the destination identity (ID) codes contained in the destination user identity fields of the packet headers. Parser 30 may take the form of a shift register with appropriate circuitry for gating out the user identity field which occurs a fixed number of bits after the packet start flag.

Buffer 31 may serve two purposes. First, it may act as a buffer between the asynchronous and synchronous portions of the system. The unevenly occurring asynchronous packets are accumulated in buffer 31 and supplied to the synchronous portion of the system in a regularly occurring synchronous manner. Buffer 31 may take the form of a first-in-first-out (FIFO) buffer. Secondly, buffer 31 may serve as a convenient place for embedding power level codes into the data packets, preferably into their headers. Each power level code is embedded at a fixed distance from its packet start flag and the resulting plural-bit field is referred to herein as the power level control field (PLCF). Power level codes can be supplied to buffer 31 by way of line 32.

The power level codes can be obtained from a power level database 33. Database 33 may contain a list of all the different destination user identities and for each such destination identity there is recorded a distinctive power level code identifying the desired transmitter power level for the data packets having that destination identity. By assigning the appropriate power level codes, the transmitted power levels may be tailored to fit the requirements of the individual receiving stations. During the operation of the system, the power level database 33 can be accessed by the destination identity codes obtained from parser 30 and the corresponding power level codes are supplied to buffer 31 for embedding into the data packets.

A secondary power level database 34 may be provided for recording received signal strength reports from the different receiving stations. This data may then be used to update the power level codes in database 33 to reflect the current operating conditions affecting the different receiving stations.

Figure 4:
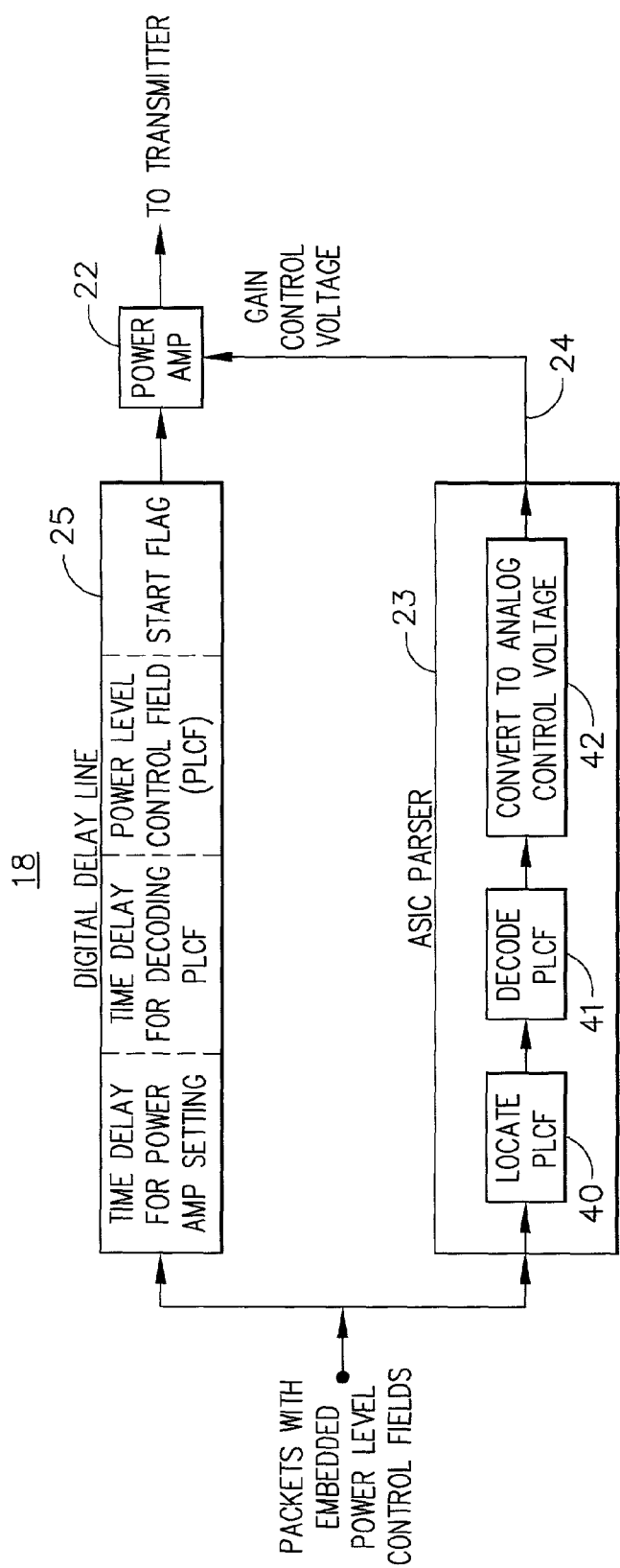
FIG. 4 is a block diagram showing in greater detail a synchronous transmitter portion of the control system of FIG. 2.

Referring to FIG. 4, there is shown in greater detail a construction of the synchronous portion 18 of the level control system. As there seen, parser mechanism 23 can include a locate mechanism 40 for locating and reproducing the power level control field (PLCF) embedded in each data packet by the FIG. 3 portion of the system. As mentioned, this power level control field can contain the power level code that identifies the desired transmitter power level for the packet. Parser 23 may also include a decode mechanism 41 for decoding the power level code and a digital-to-analog converter mechanism 42 for converting the digital code into an analog control voltage. This control voltage may be supplied to the gain control terminal of power amplifier 22 to control the signal amplification factor of power amplifier 22. As mentioned, this amplification factor controls the power of the transmitted packet signal.

As indicated in FIG. 4, the time delay mechanism 25 may take the form of a digital delay line such as can be provided by a shift register wherein the data bits are moved serially from stage to stage down the length of the register. The number of register stages and the occurrence rate of the shift pulses determines the amount of the time delay. Two primary factors need to be taken into account in selecting the amount of time delay provided by delay mechanism 25. For one thing, the time delay should include the time required by parser 23 to locate and decode the power level control field. Secondly, the time delay should include the time required for the power amplifier 22 to settle into a stable condition following a change in the gain control voltage. In this manner, the power level can be correctly set and stable before the transmission of the packet begins. Optionally, the time delay mechanism can include a circuit that modifies the packet by removing the PLCF once it has been identified by the ASIC parser, and delaying the bits that occur before the PLCF by a length of time corresponding to the length of the PLCF. The extra space (called guard time) that this creates is then available as settling time for the power amplifier 22.

The present invention tailors the transmitted power level to the needs of the individual user without restricting the timing of the packets. It is readily implementable because of the novel use of feed-forward level control while the packet stream is delayed. Because each packet gets only the power it needs, the satellite's downlink power is conserved, allowing service to be extended to more users. This invention combines the statistical multiplexing efficiency of packet switching with the power efficiency of circuit switching.

It will be obvious to those skilled in the art that various changes and modifications may be made herein without departing from the invention and it is, therefore, intended to cover all such changes and modifications as come within the true spirit and scope of the invention.

The invention claimed is:

1. A packet-based downlink level control subsystem for a wireless communication system, such subsystem comprising:
   a plurality of data packets each containing a user specific destination user identity code;
   an embedding mechanism for embedding into each packet a power level code according to the destination user identity code, wherein the power level code identifies a power level for a specific user; and
   a packet transmitter mechanism responsive to the power level code embedded within the data packet, wherein the packet transmitter mechanism adjusts the power of transmission for each data packet in accordance with the power level code.

2. A subsystem in accordance with claim 1 wherein the code embedding mechanism embeds the power level code into a packet header.

3. A subsystem in accordance with claim 1 wherein the embedded power level code is determined by a location of a receiving station relative to a center of a transmitted beam.

4. A subsystem in accordance with claim 1 wherein the embedded power level code is determined by a signal strength report received from a receiving station.

5. A subsystem in accordance with claim 1 wherein the code embedding mechanism includes a power level database listing power level codes in accordance with packet destinations and the code embedding mechanism accesses such database for determining the power level code to embed into a packet.

6. A subsystem in accordance with claim 1 wherein the packet transmitter mechanism includes:
   a power amplifier for feeding amplified packet signals to a downlink antenna; and
   a power control mechanism responsive to the power level codes in the packets to be transmitted for supplying gain control signals to the power amplifier for controlling signal strengths of transmitted packet signals.

7. A subsystem in accordance with claim 6 further including a time delay mechanism for delaying arrival of the packets at the power amplifier for allowing for settling of the power amplifier following a change in the gain control signal.

8. A method of controlling the power of downlink signals transmitted by a wireless communication system, such method comprising the steps of:
   embedding a destination user identity code into a data packet;
   determining the identity of an intended receiving station with the user identity code;
   interrogating a database for determining the desired power level for the receiving station using the user identity code;
   embedding a power level code into the data packet identifying the power level for the receiving station; and
   adjusting power of a signal transmitted to the receiving station in accordance with the power level code.

9. A method in accordance with claim 8 wherein the downlink signals are packet signals and the identities of the intended receiving stations are determined from destination user identity fields of the packets.

10. A packet-based downlink level control subsystem for a wireless communication system, such subsystem comprising:
    a data packet having a destination user identity code embedded;
    a mechanism that locates the destination user identity code within the data package and identifies a user;
    a mechanism that uses the destination user identity code to interrogate a database to determine a power level for the user;
    a mechanism that embeds a power level code into the data packet, wherein the power level code identifies the power level for the user; and
    a power control mechanism that responds to the power level code embedded within the data packet, wherein the power control mechanism supplies gain control signals to a power amplifier.

11. A subsystem in accordance with claim 10, further including a time delay mechanism that delays the transfer of the data packet having the power level code embedded to a signal input terminal of the power amplifier.

12. A subsystem in accordance with claim 10, wherein the gain control signals provide an amplification factor according to the embedded power level code to the amplifier.

13. A packet-based downlink level control subsystem for a wireless communication system, such subsystem comprising:
    an incoming data packet;
    a destination user identity code embedded within the data packet, wherein the destination user identity code identifies a receiving station;
    a database containing power level information, wherein the database is interrogated using the destination user identity code to determine a power level for the receiving station;
    a power level code embedded within the data packet, wherein the power level code identifies the power level for the receiving station;
    a power control mechanism, wherein the power control mechanism provides a gain control signal corresponding to the power level code; and
    a power amplifier; wherein the power amplifier receives the gain control signal and adjusts the amount of amplification for the data packet.

14. A subsystem in accordance with claim 13, further including a packet buffer that receives and buffers the incoming data packet, wherein the packet buffer includes circuitry that embeds the power level code into said data packet.

15. A subsystem in accordance with claim 13, wherein the database stores a listing of power level codes for various destination user identities.

* * * * *